United States Patent Office 2,867,645
Patented Jan. 6, 1959

2,867,645
PREPARATION OF ALKALI METAL SALTS OF DIESTERS OF PHOSPHORIC ACID

Willem van Eijk, Ernest George Germain Werner, and Nicolaas Max, Amsterdam, Netherlands, assignors to Shell Development Company, New York, N. Y., a corporation of Delaware No Drawing. Application January 17, 1955
Serial No. 482,378

Claims priority, application Netherlands February 12, 1954

9 Claims. (Cl. 260—461)

This invention relates to an improved process for preparing alkali metal salts of dialkyl phosphates.

As a class, the alkali metal salts of dialkyl phosphates have been found to have highly desirable properties as surface-active agents, leading to their use as wetting agents and as agents to prevent the build-up of static electricity on synthetic fibres. The sodium salts of dialkyl phosphates in which the alkyl groups are each derived from a higher aliphatic alcohol are particularly desirable.

Several methods have been proposed for effecting the preparation of such salts. One of the most common proposals involves the reaction of an alkanol with an acid halide of phosphorus, hydrolysis of the resulting dialkyl phosphoryl halide and neutralization of the resulting dialkyl acid phosphate with an alkali metal base. The proposed reactions are represented by the equations:

(1) $P(O)X_3 + 2ROH \rightarrow P(O)(X)(OR)_2 + 2HX$ (2) $P(O)(X)(OR)_2 + H_2O \rightarrow P(O)(OR)_2(OH) + HX$ (3) $P(O)(OR)_2(OH) + 2MOH + HX \rightarrow$
$P(O)(OR)_2(OM) + 2H_2O + MX$ wherein X represents a halogen atom, R represents an alkyl group and M represents an alkali metal.

While the formation of the phosphoryl halide according to Equation 1 proceeds readily, attempts to effect the hydrolysis of the halide and neutralization of the resulting acid phosphate have not been accomplished in a manner satisfactory for commercial operation. Proposals for effecting the hydrolysis and neutralization successively have not proven satisfactory, since the dialkyl phosphoryl halides are fairly resistant to hydrolysis with water. To effect the hydrolysis, it is necessary to use moderately elevated temperatures which tend to cause partial hydrolysis of the ester links. This result is especially serious where the reaction mixture is acid due to the hydrogen halide evolved during the reaction. Thus, yields of the acid phosphate have not been satisfactory for large scale use of this method. Also, the evolved hydrogen halide tends to create a very corrosive reaction mixture.

In an effort to provide a more favorable hydrolysis medium and to reduce the corrosivity of the reaction mixture, it has been proposed that the hydrolysis and neutralization be conducted simultaneously, as by treating the dialkyl phosphoryl halide with an aqueous solution of an alkali metal base. Such proposals have not proven effective in practice, because highly refractory emulsions are formed, especially where the alkyl groups involved each contain more than about four carbon atoms. These intractable emulsions greatly complicate the process, reducing the speed and degree of the hydrolysis and neutralization reactions. Further, isolation and recovery of the pure alkali metal dialkyl phosphate is very difficult, requiring an additional expensive emulsion breaking procedure.

It has now been discovered that alkali metal dialkyl phosphates can be prepared in high yield, easily and without the formation of intractable emulsions by reacting a phosphorus acid halide with the alcohol in the presence of a water-immiscible inert aliphatic liquid which is a solvent for the dialkyl phosphoryl halide product, and thereafter simultaneously hydrolyzing the dialkyl phosphoryl halide and neutralizing the resulting acid phosphate with an aqueous solution of caustic alkali metal compound.

This process possesses the substantial advantages that (a) By proper choice of the aliphatic liquid, the reaction may be carried out at the boiling point of the mixture and any hydrogen halide formed removed immediately. Thus the reaction of the phosphorus oxyhalide and alcohol can be conducted without the use of a hydrogen halide acceptor such as pyridine and without the formation of by-products;

(b) The hydrolysis and neutralization steps are carried out simultaneously, the product being a solution of the desired alkali metal dialkyl phosphate in the aliphatic liquid. This solution is easily separated from the aqueous phase which contains any excess caustic base and all of the inorganic salts;

(c) Intractable emulsions are not formed;

(d) The hydrogen halide evolved during the hydrolysis step is neutralized immediately providing a non-acid medium in which the hydrolysis can be effected without causing splitting of the ester links.

The process is thus readily adaptable to the large scale production of alkali metal salts of dialkyl acid phosphates.

The essence of the present invention lies in the discovery that the presence of a particular kind of liquid diluent in the reaction zone permits the various necessary reactions to go forward without the heretofore encountered difficulties. The kind of compound that is suitable as the diluent may be characterized as a water-immiscible inert aliphatic compound which is a liquid at ordinary temperatures and pressures, and which is a good solvent for the dialkyl phosphoryl halide intermediate product. Suitable diluents include any pure aliphatic hydrocarbon or mixture of such hydrocarbons, which are ordinarily liquid. Examples include both the straight-chain and branched-chain alkanes, such as the various isomers of pentane, hexane, octane, nonane and the like. Also suitable as the diluent are technical mixtures of aliphatic hydrocarbons, such as various gasoline fractions, which contain less than about 7% by weight of aromatic compounds. Since the degree to which intractable emulsions are suppressed is directly related to the degree with which the reaction mixture is free from aromatic compounds, it is preferred that the aromatic content of the diluent be as low as possible—an aromatic content of less than about 2% or less, perhaps about 0.5%, by weight being preferred.

Another group of compounds suitable as the aliphatic organic liquid are the halogenated aliphatic hydrocarbons, especially the halogenated alkanes, such as carbon tetrachloride, carbon tetrabromide, monochloroethane, -propane, -butane and their various polychloro analogs, the corresponding brominated alkanes, etc.

To facilitate the distillation of the diluent, it is desirable that the boiling point thereof should not be too high. Accordingly, liquids boiling within the range of between about 50° C. and about 170° C. are preferably used as the diluent. A liquid with a boiling point within range of approximately 80° C. to 110° C. is very suitable. These low-boiling hydrocarbons have the added advantage that in general the more volatile hydrocarbons show less of a tendency to form emulsions than do the less volatile hydrocarbons.

As the alcohol reactant there may be used any alkanol. The hydrocarbon component of the alcohol (alkyl group) may be either straight-chain or branched-chain in configuration. The alkyl groups may contain any number of carbon atoms. It is preferred, however, that each of the alkyl groups be of branched-chain configuration and that it contain at least four, but preferably not more than about 17, carbon atoms. Preferred alkyl groups include those containing from about 7 to about 14 carbon atoms, examples being the various isomers of the nonyl group, the 3,3,5-trimethylhexyl group especially, and the various isomers of the heptyl, octyl and decyl groups. Of particular value as the alcohol reactant are the commercially available long-chain alcohols of branched-chain configuration known as nonanol and alphanol. Nonanol is a mixture of the various isomers of trimethylhexanol and alphanol is a mixture of the various $C_7$-$C_9$ alkanols.

The halogen atom of the phosphorus acid halide may be any of the lower members of group VII-A of the periodic chart of the elements (Merck Index, 6th edition, 1952), i. e. fluorine, chlorine, bromine or iodine. It is preferred that the phosphorus acid halide be phosphorus oxychloride, $POCl_3$.

The reaction is preferably conducted at a temperature within the range of from about 0° C. to about 40° C., the range lying between about 15° C. and 20° C. being optimum. Preferred practice requires that the reaction be conducted at the boiling point of the solvent used, in a system equipped with a reflux condenser. The system is heated at such a rate that gentle reflux rate is maintained. The hydrogen halide formed during the reaction is vented as formed.

It is preferred that the alcohol and acid halide be fed to the reaction zone in the theoretical proportions—i. e., 2 mols of alcohol per mol of acid halide. Addition of more than 2 mols of alcohol per mol of acid halide does not bring about a sufficient increase in dialkyl phosphoryl halide yield to be economically justified, while, on the other hand, a smaller quantity of alcohol results in a decrease in the yield of the desired product. It must be noted that, although at least two mols of alcohol per mol of acid halide are required to assure maximum yield of product, a minor, but substantial amount of the alcohol remains unreacted.

The final product of the reaction of the phosphorus oxyhalide and alkanol carried out according to the process of the invention comprises a mixture of the dialkyl phosphoryl halide, unreacted alcohol and the aliphatic solvent. Hydrolysis of this mixture to form the dialkyl acid phosphate and neutralization of the acid phosphate to form the alkali metal salt is conducted merely by agitating together the reaction mixture from the first stage and an aqueous solution of a caustic alkali metal compound.

The hydrolysis-neutralization step is carried out at a temperature of from about 20° C. to about 80° C., and preferably within the range of from about 40° C. to about 60° C.

As the alkali metal base there may be used any alkali metal compound capable of neutralizing the acid phosphate and, of course, the hydrogen halide formed. The term alkali metal has its usual meaning—i. e., any metal of group I-A of the periodic chart of the elements (Merck Index, 6th ed., 1952). Of this group, sodium and potassium are preferred because of their availability and low cost. The anionic portion of the alkali metal base may be the anion of any weak acid. Examples are the hydroxyl ($OH^-$) and carbonate ($CO_3^=$) ions. Preferred as the alkali metal base are sodium hydroxide and sodium carbonate.

The amounts of water and alkali metal base added must be at least those amounts theoretically required to complete the desired reactions. It is preferred that a moderate excess of both water and alkali metal base be present in the reaction zone at all times. The alkali metal base and water are conveniently introduced in the form of an aqueous solution of the base containing from about 7.5 to about 25% by weight, and preferably from about 10 to about 15% by weight, of base. There is added sufficient of such a solution to provide an excess of base of from about 5% to about 30% over the quantity of base theoretically required to effect complete neutralization of the acid phosphate and the hydrogen halide formed. It is preferred that the excess of base be about 10% to about 15%.

It is preferred that the product be introduced into the alkali solution, rather than that the alkali solution be introduced into the crude product. This preferred procedure insures that the phosphorus compound always comes into a medium containing an excess of alkali metal base, which favorably affects the rate of hydrolysis, prevents hydrolysis of the ester links and reduces corrosion substantially. It is also preferred that as much as possible of the hydrogen halide formed during the reaction of the alcohol and phosphorus oxyhalide be removed, before the product is reacted with the alkali base. This reduces the amount of alkali base required and also insures that the hydrolysis and neutralization reactions will not take place in an acid medium.

After treatment with caustic alkali the mixture consists of an organic liquid phase and an aqueous phase. The desired dialkyl alkali metal phosphate is chiefly present in the organic liquid phase alone. The liquid is preferably allowed to stand for some time to allow it to stratify into two layers. After removal of the aqueous phase, the organic liquid is subjected to distillation, preferably in vacuo. As a result the diluent which was originally added is removed.

After the diluent has been distilled off, it may be desirable to carry out a steam distillation in vacuo to remove the polar organic substance.

The aqueous phase contains the bulk of the by-products formed during esterification, particularly any alkyl di(alkali metal) phosphate formed. This compound may be separated from the liquid and either used as such or converted into other phosphorus compounds.

It has been found that the separation of the desired dialkyl monoalkali metal phosphate from the by-products formed during the reaction, particularly monoalkyl di(alkali metal) phosphates, as well as inorganic salts, is aided by ensuring that the reaction mixture during treatment with caustic alkali contains a small quantity of a polar organic substance which, however, must have no emulsifying effect, or which should preferably even have a demulsifying effect. Particularly good examples of such substances are alcohols which do not contain an aromatic group in the molecule. Suitable as the alcohol thus are the various alkanols, of either straight-chain or branched-chain configuration. Of especial value are the various long chain alcohols designated commercially as nonanol (mixture of isomers of trimethylhexanol-1) and alphanol (mixture of $C_7$-$C_9$ alkanols).

The quantity of the polar organic substance should preferably be 0.1 to 10% by weight, with respect to the quantity of the solvent added according to the invention.

The presence of the polar organic substance ensures a very favorable distribution of the various substances over both the liquid phases, so that scarcely any of the desired dialkyl alkali metal phosphate remains in the aqueous phase, while all the by-products, particularly alkyl di(alkali metal) phosphate, are wholly or almost wholly present in that phase. It is obvious from this discussion that the most convenient source of the polar organic substance is the alkanol from which the dialkyl phosphoryl halide was derived. The reaction mixture from the first stage of the new process—a mixture of dialkyl phosphoryl halide, unreacted alkanol and the aliphatic solvent—is thus an ideal source of the phosphoryl halide for the second step, for the phosphoryl halide is the initial reactant, the aliphatic organic liquid is identical to that necessary to the suppression of emulsions during the hydrolysis—neutralization reactions and the alcohol is one of the preferred polar organic substances used to aid in separation of the alkali metal dialkyl phosphate from the inorganic salts.

The invention is illustrated by the following example.

*Example*

Sodium dinonyl phosphate was prepared starting from nonanol (primarily 3,5,5-trimethylhexanol-1), technically pure phosphorus oxychloride which was freshly distilled and had a boiling range of 103° C–108° C. and sodium hydroxide of technical quality.

37.6 kg. of aromatic-free gasoline (aromatic content lower than 0.5% by weight) with a boiling range of 80°–110° C., and subsequently 37.6 kg. of nonanol (260 mol) were introduced into a reaction vessel with a capacity of 500 litres. 20 kg. of $POCl_3$ (130 mol) were added to the resultant solution, while stirring, during three hours at a temperature of preferably 20° C. The reaction heat generated was eliminated by cooling with water, so that the temperature was kept between 15° C. and 20° C.

After all the $POCl_3$ had been added, the mixture was stirred for another hour, after which the reaction vessel was opened and the reaction mixture was drawn off (90.7 kg.). During this operation part of the HCl gas which had formed during the reaction and remained dissolved in the liquid escaped. The remainder was removed by gentle heating.

The saponification number of the reaction mixture was then determined for a sample using thymolphthalein as indicator. 4.38 mg. of aqueous KOH were used per gram of the mixture.

A 10% by weight solution of 17.31 kg. NaOH in water was introduced into a vessel with a capacity of 1000 litres, and 89.7 kg. of the reaction mixture was then added, while stirring, during 35 minutes at a temperature of approximately 50° C. The quantity of NaOH was so chosen that it was present in a 10% excess calculated on the saponification number determined. After the whole of the above-mentioned quantity of the reaction mixture had been added, the mixture was stirred for another period of one hour until the caustic alkali content remained constant (determined by titrating samples with thymolphthalein as the indicator). The reaction mixture was then allowed to stand until it separated into two layers, after which the two layers were separated from each other. The time required for the mixture to stratify into two layers was 1½ hours. During this period the temperature dropped from approximately 50° C. to approximately 40° C.

Thus an aqueous bottom layer of 170 kg. and an organic upper layer of 89.5 kg. were obtained. 87.4 kg. of the organic liquid were introduced into a distillation vessel with a capacity of 250 litres and the gasoline was distilled off in the course of 2½ hours at a pressure of 50–60 mm. Hg and a maximum bottom temperature of 56° C. 50 kg. of distilled water was then added at ordinary pressure and 3.4 kg. of unconverted nonanol was distilled off by means of a vacuum steam distillation during 8 hours at a pressure of 50–60 mm. Hg and a maximum bottom temperature of 76° C. a mixture being obtained as the residue consisting approximately of 72% dinonyl sodium phosphate, 20% water, 4% nonanol and 4% mononyl disodium phosphate. According to calculations 53.2 kg. of dinonyl sodium phosphate were obtained in this manner. This is a yield of 72 mol percent calculated on the quantity of nonanol used as starting material.

We claim as our invention:

1. In a process for preparing an alkali metal dialkyl phosphate by reacting a phosphorus oxyhalide with an alkanol having between 4 and 17 carbon atoms in the presence of an inert liquid water-immiscible aliphatic diluent selected from the group consisting of alkanes and halogenated alkanes having boiling points between about 50° and about 170° C., and mixtures thereof and thereafter reacting the resulting dialkyl phosphoryl halide with an aqueous solution of an alkali metal base to hydrolyze said phosphoryl halide to the corresponding acid and to neutralize said corresponding acid, the improvement which comprises conducting the reaction of the phosphoryl halide with the aqueous solution of the alkali metal base in the presence of the same inert liquid water-immiscible aliphatic diluent used in the preparation of the dialkyl phosporyl halide so that a system consisting only of two liquid phases is formed.

2. In a process for preparing an alkali metal dialkyl phosphate by reacting a phosphorus oxyhalide with an alkanol having between 4 and 17 carbon atoms in the presence of an inert liquid water-immiscible aliphatic diluent selected from the group consisting of alkanes and halogenated alkanes having boiling points between about 50° and about 170° C. and mixtures thereof, and thereafter reacting the resulting dialkyl phosphoryl halide with an aqueous solution of an alkali metal base to hydrolyze said phosphoryl halide to the corresponding acid and to neutralize said corresponding acid, the improvement which comprises conducting the reaction of the phosphoryl halide with the aqueous solution of the alkali metal base in the presence of the same inert liquid water-immiscible aliphatic diluent used in the preparation of the dialkyl phosphoryl halide and in the presence of the alkanol used in the preparation of the dialkyl phosphoryl halide, the reaction system consisting only of two liquid phases.

3. The process of claim 1 wherein the diluent comprises at least one aliphatic alkane having a boiling point between about 50° and about 170° C.

4. The process of claim 1 wherein the diluent comprises a gasoline fraction having a boiling range within the range of from about 50° C. to about 170° C. and contains less than about 7% by weight of aromatic compounds.

5. A process for preparing sodium di(nonyl) phosphate comprising mixing phosphorus oxychloride with nonanol in the presence of a gasoline fraction boiling within the range of from about 80° C. to about 110° C. and containing less than about 0.5% by weight of aromatic compounds and intimately contacting the resulting mixture with an aqueous solution of sodium hydroxide to form a system consisting only of two liquid phases.

6. A process for preparing an alkali metal dialkyl phosphate comprising intimately mixing a solution of a dialkyl phosphoryl halide wherein the alkyl radicals have between 4 and 17 carbon atoms, in an inert, water-immiscible aliphatic solvent selected from the group consisting of alkanes and halogenated alkanes having boiling points between about 50° and about 170° C. and mixtures thereof and an aqueous solution of an alkali metal base to form a system consisting only of two liquid phases.

7. The process of claim 6 in which the diluent is a gasoline fraction having a boiling range within the range of from about 50° C. to about 170° C. and contains less than about 2% by weight of aromatic materials.

8. A process for preparing an alkali metal dialkyl phosphate comprising intimately contacting a solution of a dialkyl phosphoryl halide wherein the alkyl radicals have between 4 and 17 carbon atoms in an inert, water-immiscible aliphatic solvent selected from the group consisting of alkanes and halogenated alkanes having boiling points between about 50° and about 170° C., and mixtures thereof, with an aqueous solution of an alkali metal base in the presence of an aliphatic alkanol having between 4 and 17 carbon atoms to form a system consisting only of two liquid phases.

9. The process of claim 8 in which the alkyl group of the alkanol is the same as the alkyl groups of the dialkyl phosphoryl halide reacted.

References Cited in the file of this patent

UNITED STATES PATENTS

| | | |
|---|---|---|
| 2,005,619 | Graves | June 18, 1935 |
| 2,624,750 | Pechukas | Jan. 6, 1953 |

OTHER REFERENCES

Plimmer et al.: Jour. Chem. Soc. 1929, 279–291